(12) United States Patent
Kei (10) Patent No.: US 11,852,646 B2
(45) Date of Patent: Dec. 26, 2023

(54) SAMPLE ANALYSIS SUPPORT APPARATUS

(71) Applicant: YOKOGAWA ELECTRIC CORPORATION, Tokyo (JP)

(72) Inventor: Takayuki Kei, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 94 days.

(21) Appl. No.: 17/050,681

(22) PCT Filed: Apr. 22, 2019

(86) PCT No.: PCT/JP2019/017075
§ 371 (c)(1),
(2) Date: Oct. 26, 2020

(87) PCT Pub. No.: WO2019/235089
PCT Pub. Date: Dec. 12, 2019

(65) Prior Publication Data
US 2021/0231697 A1    Jul. 29, 2021

(30) Foreign Application Priority Data

Jun. 8, 2018  (JP) .................................. 2018-110548

(51) Int. Cl.
*G01N 35/10* (2006.01)
(52) U.S. Cl.
CPC ... *G01N 35/1072* (2013.01); *G01N 2035/103* (2013.01)
(58) Field of Classification Search
None
See application file for complete search history.

(56) References Cited

U.S. PATENT DOCUMENTS

| | | | |
|---|---|---|---|
| 7,169,362 B2 | 1/2007 | Toi et al. | |
| 9,766,445 B2 | 9/2017 | Kei et al. | |
| 10,458,999 B2 | 10/2019 | Kei et al. | |
| 2004/0096360 A1* | 5/2004 | Toi | G01N 35/1067 422/511 |
| 2013/0280145 A1* | 10/2013 | West | G01N 35/1065 29/428 |

(Continued)

FOREIGN PATENT DOCUMENTS

| | | |
|---|---|---|
| EP | 0628823 A1 | 12/1994 |
| JP | 2001-74756 A | 3/2001 |

(Continued)

*Primary Examiner* — P. Kathryn Wright
(74) *Attorney, Agent, or Firm* — Rankin, Hill & Clark LLP (57) ABSTRACT

A sample analysis support apparatus includes a sample region in which a sample is to be disposed, a tip region in which a tip is to be disposed, a first operation unit capable of an operation on the sample using the tip, the tip being attachable to and detachable from the first operation unit, a second operation unit capable of an operation on the sample using the tip, the tip being attachable to and detachable from the second operation unit, a transport unit configured to support each of the first operation unit and the second operation unit moveably between the tip region and the sample region, and a movement controller capable of controlling the transport unit to move each of the first operation unit and the second operation unit between the tip region and the sample region.

11 Claims, 7 Drawing Sheets

(56) References Cited

U.S. PATENT DOCUMENTS

2020/0139360 A1* 5/2020 Limbach ............ G01N 35/1002

FOREIGN PATENT DOCUMENTS

| JP | 2005127861 A | | 5/2005 |
| JP | 2005-341877 A | | 12/2005 |
| JP | 2006158335 A | | 6/2006 |
| JP | 2011120582 A | * | 6/2011 |
| JP | 6066110 B2 | | 1/2017 |
| JP | 6090387 B2 | | 3/2017 |
| WO | 2013/012452 A2 | | 1/2013 |

* cited by examiner

SAMPLE ANALYSIS SUPPORT APPARATUS

CROSS-REFERENCE TO RELATED APPLICATION

The present application claims priority to and the benefit of Japanese Patent Application No. 2018-110548 filed Jun. 8, 2018, the entire contents of which are incorporated herein by reference.

TECHNICAL FIELD

The present disclosure relates to a sample analysis support apparatus.

BACKGROUND

In the field of drug discovery screening, for example, a substance serving as a potential drug, such as a compound, is administered to a sample such as cells, which are the basic constituent element of living organisms. The sample is collected after the sample reacts with the substance. For example, patent literature (PTL) 1 discloses an apparatus that automatically performs operations for collecting the sample at a tip, such as a nanospray tip. PTL 2 discloses a technique for highly accurate positioning control of the tip in the apparatus. PTL 3 discloses a technique for using a nanopipette to administer a substance, such as a compound, to a sample, such as cells.

CITATION LIST

Patent Literature

PTL 1: JP 6066110 B2
PTL 2: JP 6090387 B2
PTL 3: WO2013/012452

SUMMARY

Technical Problem

The apparatuses disclosed in PTL 1 and 2 include a sample holder where a sample is placed, a tip holder where a tip is placed, and an operation unit to which the tip is attachable and detachable and which is capable of operations such as collecting the sample with the tip. The apparatus disclosed in PTL 1 and 2 only includes one operation unit, however, and therefore has room for improvement in terms of throughput and range of applications.

It is therefore an aim of the present disclosure to provide a sample analysis support apparatus capable of improving throughput and/or broadening the range of applications.

Solution to Problem

A sample analysis support apparatus according to an embodiment includes a sample holder in which a sample is to be disposed; a tip holder in which a tip is to be disposed; a first operation unit capable of an operation on the sample using the tip, the tip being attachable to and detachable from the first operation unit; a second operation unit capable of an operation on the sample using the tip, the tip being attachable to and detachable from the second operation unit; a transport unit configured to support each of the first operation unit and the second operation unit moveably between the tip holder and the sample holder; and a movement controller capable of controlling the transport unit to move each of the first operation unit and the second operation unit between the tip holder and the sample holder. As compared to when only one operation unit is provided, this configuration can improve throughput and/or broaden the range of applications.

In an embodiment, the operation on the sample by the first operation unit may include collection of the sample and/or provision of a substance to the sample, and the operation on the sample by the second operation unit may include collection of the sample and/or provision of a substance to the sample.

In an embodiment, the tip may include an end opening, located at an end of the tip, to enable collection of the sample and/or provision of a substance to the sample. This configuration enables the sample to be collected and/or a substance to be provided to the sample through the end opening precisely.

In an embodiment, the operation on the sample by the first operation unit may include collection of the sample, and the operation on the sample by the second operation unit may include collection of the sample. This configuration can improve throughput and/or broaden the range of applications.

In an embodiment, the tip may include a first tip attachable to and detachable from the first operation unit and a second tip attachable to and detachable from the second operation unit, and the end opening of the first tip and the end opening of the second tip may be equivalent in size. As compared to when only one operation unit is provided, this configuration can shorten the transportation time of the collected sample and improve throughput.

In an embodiment, the tip may include a first tip attachable to and detachable from the first operation unit and a second tip attachable to and detachable from the second operation unit, and the end opening of the first tip may be smaller than the end opening of the second tip. This configuration enables a portion of the specific sample to be collected by the first tip and the entire sample to be collected by the second tip, for example. The range of analysis applications can therefore be broadened.

In an embodiment, the operation on the sample by the first operation unit may include collection of an intracellular substance of a specific cell, and the operation on the sample by the second operation unit may include collection of the specific cell.

In an embodiment, the operation on the sample by the first operation unit may include provision of a substance to the sample, and the operation on the sample by the second operation unit may include collection of the sample. This configuration enables collection of the sample to which a substance has been provided, thereby broadening the range of applications.

In an embodiment, the operation on the sample by the first operation unit may include provision of a substance to a specific cell, and the operation on the sample by the second operation unit may include collection of the specific cell, an intracellular substance of the specific cell, or a cell close to the specific cell. This configuration enables observation of the effect of providing a substance to a specific cell.

In an embodiment, the sample holder may include a predetermined operation position where the operation on the sample by the first operation unit and the operation on the sample by the second operation unit are performed alternatively.

In an embodiment, the movement controller may be capable of attaching the first tip onto the first operation unit in the tip holder, moving the first operation unit from the tip holder to the sample holder, performing the operation on the sample using the first tip in the sample holder, and moving the first operation unit from the sample holder to the tip holder, and the movement controller may be capable of attaching the second tip onto the second operation unit in the tip holder, moving the second operation unit from the tip holder to the sample holder, performing the operation on the sample using the second tip in the sample holder, and moving the second operation unit from the sample holder to the tip holder. This configuration enables stable operations on the sample.

In an embodiment, the transport unit may be a transport stage used by both the first operation unit and the second operation unit. This configuration II) enables a reduction in space and in cost.

In an embodiment, the transportation stage may include a z-direction support configured to support the first operation unit movably in a z-direction, which is the vertical direction, a z-direction guide capable of guiding the z-direction support in the z-direction, a y-direction support including the z-direction guide and configured to support the z-direction support movably in a y-direction, which is a predetermined direction in the horizontal plane, a y-direction guide capable of guiding the y-direction support in the y-direction, an x-direction support including the y-direction guide and configured to support the y-direction support movably in an x-direction, which is a direction orthogonal to the y-direction in the horizontal plane, and an x-direction guide capable of guiding the x-direction support in the x-direction.

In an embodiment, the transportation stage may include a z-direction support configured to support the second operation unit movably in a z-direction, which is the vertical direction, a z-direction guide capable of guiding the z-direction support in the z-direction, a y-direction support including the z-direction guide and configured to support the z-direction support movably in a y-direction, which is a predetermined direction in the horizontal plane, a y-direction guide capable of guiding the y-direction support in the y-direction, an x-direction support including the y-direction guide and configured to support the y-direction support movably in an x-direction, which is a direction orthogonal to the y-direction in the horizontal plane, and an x-direction guide capable of guiding the x-direction support in the x-direction.

In an embodiment, the x-direction guide for the first operation unit may be configured to be also used as the x-direction guide for the second operation unit. This configuration enables a reduction in space and in cost.

In an embodiment, the x-direction guide for the first operation unit may be configured to be also used as the x-direction guide for the second operation unit, and the y-direction guide for the first operation unit may be configured to be also used as the y-direction guide for the second operation unit. This configuration enables a reduction in space and in cost.

In an embodiment, the x-direction guide for the first operation unit may be configured to be also used as the x-direction guide for the second operation unit, the y-direction guide for the first operation unit may be configured to be also used as the y-direction guide for the second operation unit, and the z-direction guide for the first operation unit may be configured to be also used as the z-direction guide for the second operation unit. This configuration enables a reduction in space and in cost.

In an embodiment, the sample holder and the tip holder may be adjacent to or separated from each other in the x-direction.

In an embodiment, the sample holder and the tip holder may be adjacent to or separated from each other in the y-direction.

Advantageous Effect

The present disclosure can provide a sample analysis support apparatus capable of improving throughput and/or broadening the range of applications.

DETAILED DESCRIPTION

Embodiments of the present disclosure are described below using examples, with reference to the drawings. Common elements between drawings are labeled with the same reference numbers. In the present disclosure, the z-direction refers to the vertical direction (the up-down direction in FIG. 1 and the like); the y-direction refers to a predetermined direction in the horizontal plane (the depth direction in FIG. 1 and the like), and the x-direction refers to a direction orthogonal to the y-direction in the horizontal plane (the left-right direction in FIG. 1 and the like).

(Configuration of Sample Analysis Support Apparatus 1)

Figure 1:
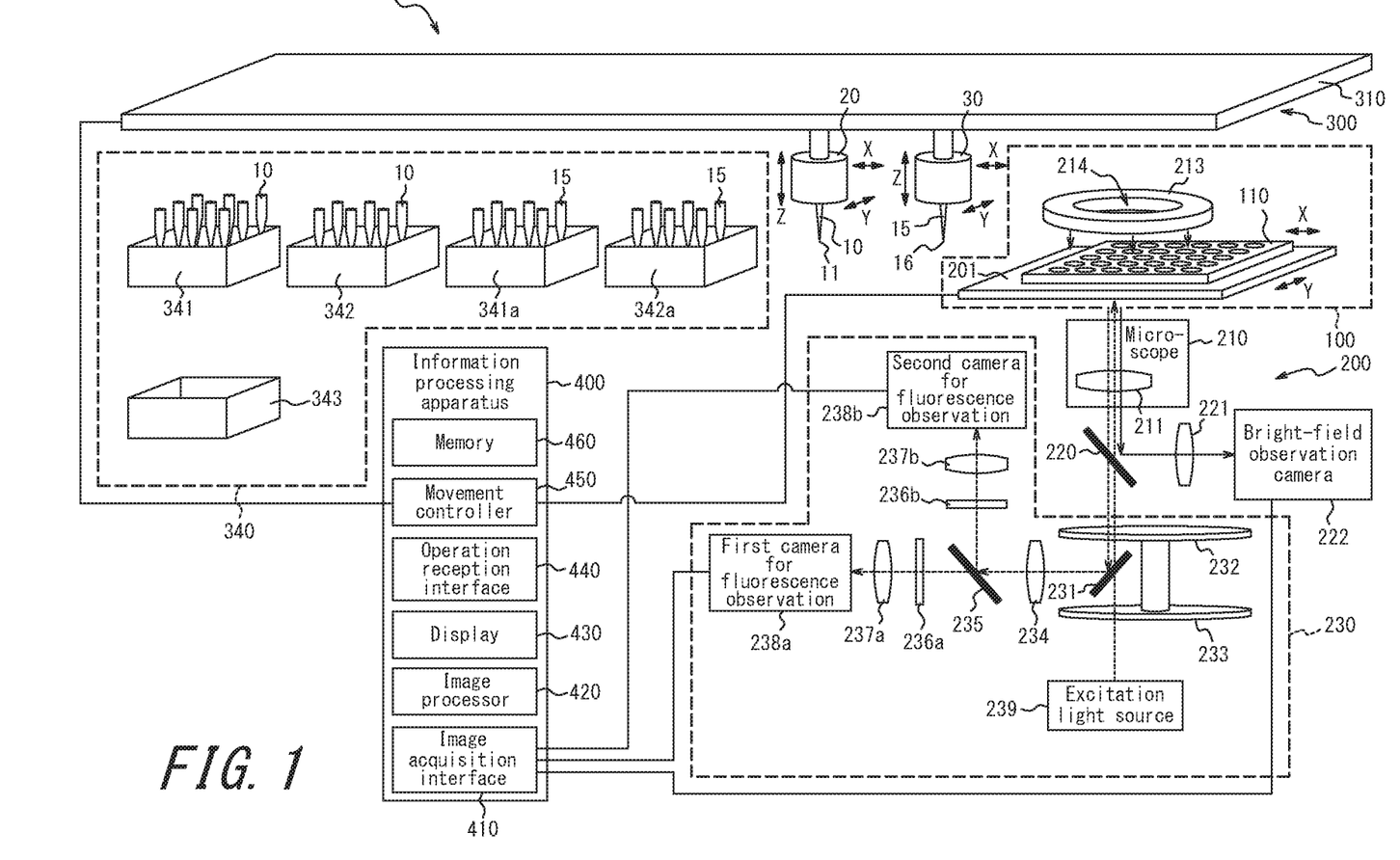
FIG. 1 illustrates the configuration of a sample analysis support apparatus according to an embodiment of the present disclosure.

First, the configuration of a sample analysis support apparatus 1 according to an embodiment of the present disclosure is described with reference to FIGS. 1 to 4. FIG. 1 illustrates the configuration of a sample analysis support apparatus 1 according to an embodiment of the present disclosure. As illustrated in FIG. 1, the sample analysis support apparatus 1 includes an operation unit 300, an optical system 200, and an information processing apparatus 400.

As illustrated in FIG. 1, the operation unit 300 includes a sample holder 100, a tip holder 340, a first operation unit 20, a second operation unit 30, and a transport unit 310. In the present embodiment, the transport unit 310 is configured as a transport stage used by both the first operation unit 20 and the second operation unit 30. The transport unit 310 may, however, be configured as transport stages provided separately for the first operation unit 20 and the second operation unit 30.

A sample, such as cells or an intracellular substance, is disposed in the sample holder 100. The sample is housed in a sample container 110, such as a cell culture container with a plurality of wells formed therein. FIG. 1 illustrates the sample container 110 as being a microplate cell culture container, but the sample container 110 is not limited to being a microplate and may be a cell culture dish, a cover glass chamber, a petri dish, or the like. The sample container 110 is supported by an XY-stage 201. Details of the XY-stage 201 are provided below.

Tips are disposed in the tip holder 340. Specifically, an unused first tip container 341 containing unused first tips 10, an unused second tip container 341a containing unused second tips 15, a used first tip container 342 containing used first tips 10, and a used second tip container 342a containing used second tips 15 are disposed in the tip holder 340. Here, an unused tip refers to a tip that has not yet been used in an operation on the sample. A used tip refers to a tip that has already been used in an operation on the sample. As illustrated in FIG. 1, the tip holder 340 and the sample holder 100 are separated in the x-direction in the present embodiment. Specifically, the tip holder 340 is disposed on one side (the left in FIG. 1) in the x-direction from the sample holder 100.

A substance container 343 containing a substance to be provided to the sample may further be disposed in the tip holder 340. Examples of the substance to be provided to the sample include compounds that are drug candidates, such as anticancer agents.

The first tip 10 can be attached to and removed from the first operation unit 20. The first tip 10 is used in operations on the sample. In the present embodiment, operations on the sample using the first tip 10 include collection of the sample and/or provision of a substance to the sample. As illustrated in FIG. 1, the first tip 10 is attached to the first operation unit 20 with an end 11 facing down in the present embodiment.

Figure 2:
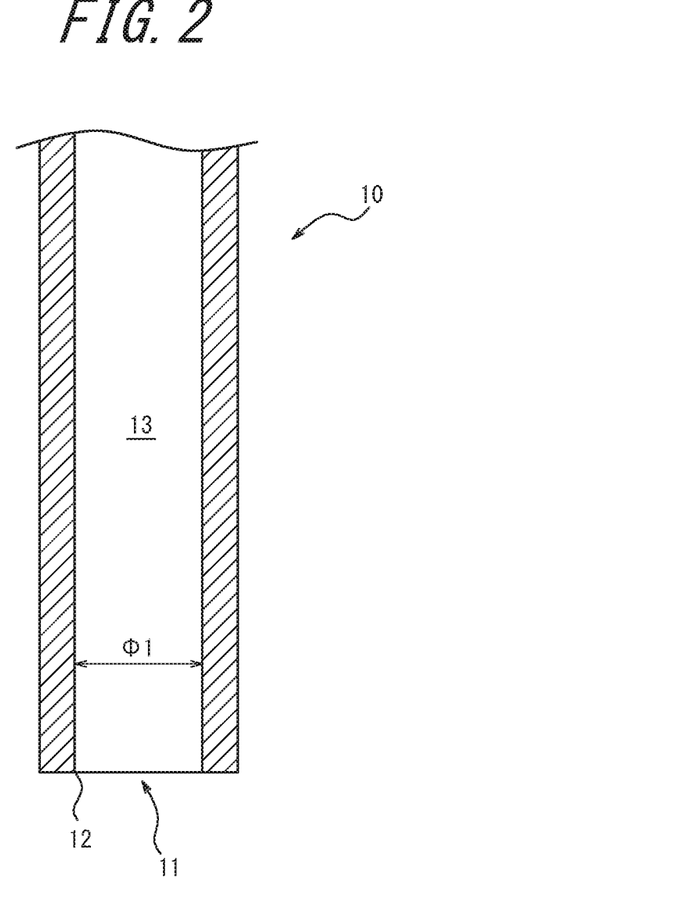
FIG. 2 is a longitudinal section illustrating an enlargement of a portion including the end of a first tip of FIG. 1.

FIG. 2 is a longitudinal section illustrating an enlargement of a portion including the end 11 of the first tip 10. As illustrated in FIG. 2, the first tip 10 includes an end opening 12, located at an end 11, and a hollow section 13 connecting to the outside through the end opening 12. The end opening 12 of the first tip 10 can collect the sample and/or provide a substance to the sample. In other words, the first tip 10 can collect the sample through the end opening 12 and hold the collected sample in the hollow section 13 and/or can provide a substance held in the hollow section 13 to the sample through the end opening 12. The substance held in the hollow section 13 of the first tip 10 is the same as the substance, contained in the substance container 343, to be provided to the sample. The substance held in the hollow section 13 of the first tip 10 may be a substance that was contained in the substance container 343 and collected through the end opening 12 or may be a substance held in advance in the hollow section 13 of the first tip 10.

When used to collect the sample, the first tip 10 may, for example, be a nanospray tip for selectively collecting a specific cell or a specific intracellular substance as the sample. The inner diameter $\phi 1$ of the end opening 12 when the first tip 10 is a nanospray tip is on the order of 1 micrometer to 10 micrometers. When used to provide a substance to the sample, the first tip 10 is preferably a nanopipette, whose end opening 12 has a smaller inner diameter $\phi 1$ than that of a nanospray tip, so as not to damage the cell serving as the sample when the cell is punctured with the end 11 to inject the substance. The inner diameter $\phi 1$ of the end opening 12 when the first tip 10 is a nanopipette is several tens of nanometers or less.

The second tip 15 can be attached to and removed from the second operation unit 30. The second tip 15 is used in operations on the sample. In the present embodiment, operations on the sample using the second tip 15 include collection of the sample and/or provision of a substance to the sample. As illustrated in FIG. 1, the second tip 15 is attached to the second operation unit 30 with an end 16 facing down in the present embodiment.

Figure 3:
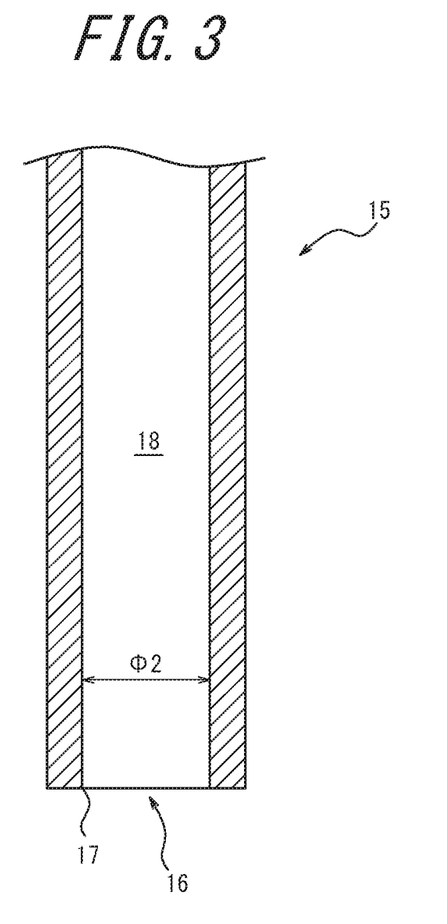
FIG. 3 is a longitudinal section illustrating an enlargement of a portion including the end of a second tip of FIG. 1.

FIG. 3 is a longitudinal section illustrating an enlargement of a portion including the end 16 of the second tip 15. As illustrated in FIG. 3, the second tip 15 includes an end opening 17, located at an end 16, and a hollow section 18 connecting to the outside through the end opening 17. The end opening 17 of the second tip 15 can collect the sample and/or provide a substance to the sample. In other words, the second tip 15 can collect the sample through the end opening 17 and hold the collected sample in the hollow section 18 and/or can provide a substance held in the hollow section 18 to the sample through the end opening 17. The substance held in the hollow section 18 of the second tip 15 is the same as the substance, contained in the substance container 343, to be provided to the sample. The substance held in the hollow section 18 of the second tip 15 may be a substance that was contained in the substance container 343 and collected through the end opening 17 or may be a substance held in advance in the hollow section 18 of the second tip 15.

When used to collect the sample, the second tip 15 may, for example, be a nanospray tip for selectively collecting a specific cell or a specific intracellular substance as the sample. The inner diameter $\phi 2$ of the end opening 17 when the second tip 15 is a nanospray tip is on the order of 1 micrometer to 10 micrometers. When used to provide a substance to the sample, the second tip 15 is preferably a nanopipette, whose end opening 17 has a smaller inner diameter $\phi 2$ than that of a nanospray tip, so as not to damage the cell serving as the sample when the cell is punctured with the end 16 to inject the substance. The inner diameter $\phi 2$ of the end opening 17 when the second tip 15 is a nanopipette is several tens of nanometers or less.

The first tip 10 is attachable to and detachable from the first operation unit 20 illustrated in FIG. 1, and the first operation unit 20 is capable of operations on the sample using the first tip 10. In the present embodiment, operations on the sample by the first operation unit 20 include collection of the sample and/or provision of a substance to the sample, as described above. In the case of collecting the sample, the first operation unit 20 may be a suction unit capable of suctioning the sample through the end opening 12. The suction unit serving as the first operation unit 20 can, for example, reciprocally move the first tip 10 in the z-direction while the end 11 of the first tip 10 is in contact with the surface of the sample, thereby suctioning the sample through the end opening 12 by capillarity and inertial force. The reciprocal motion in the z-direction of the first tip 10 may be performed by the transport unit 310. In the case of providing a substance to the sample, the first operation unit 20 may be an injection unit capable of injecting a substance held in the hollow section 13 while the end 11 of the first tip 10 has punctured a cell serving as the sample. When the above-described nanopipette is used as the first tip 10, for example, the injection unit serving as the first operation unit 20 can apply a voltage, to an electrode provided on the nanopipette, for ejecting the substance held in the hollow section 13, thereby ejecting the substance from the end opening 12. The injection unit serving as the first operation unit 20 may be capable of collecting the substance contained in the substance container 343 into the hollow section 13 through the end opening 12 of the first tip 10. The first operation unit 20 may include the functions of both of the above-described suction unit and injection unit.

The second tip 15 is attachable to and detachable from the second operation unit 30, and the second operation unit 30 is capable of operations on the sample using the second tip 15. In the present embodiment, operations on the sample by the second operation unit 30 include collection of the sample and/or provision of a substance to the sample, as described above. In the case of collecting the sample, the second operation unit 30 may be a suction unit capable of suctioning the sample through the end opening 17. The suction unit serving as the second operation unit 30 can, for example, reciprocally move the second tip 15 in the z-direction while the end 16 of the second tip 15 is in contact with the surface of the sample, thereby suctioning the sample through the end opening 17 by capillarity and inertial force. The reciprocal motion in the z-direction of the second tip 15 may be performed by the transport unit 310. In the case of providing a substance to the sample, the second operation unit 30 may be an injection unit capable of injecting a substance held in the hollow section 18 while the end 16 of the second tip 15 has punctured a cell serving as the sample. When the above-described nanopipette is used as the second tip 15, for example, the injection unit serving as the second operation unit 30 can apply a voltage, to an electrode provided on the nanopipette, for ejecting the substance held in the hollow section 18, thereby ejecting the substance from the end opening 17. The injection unit serving as the second operation unit 30 may be capable of collecting the substance contained in the substance container 343 into the hollow section 18 through the end opening 17 of the second tip 15. The second operation unit 30 may include the functions of both of the above-described suction unit and injection unit.

The transport unit 310 supports each of the first operation unit 20 and the second operation unit 30 moveably between the tip holder 340 and the sample holder 100. Specifically, as illustrated in FIG. 1, the transport unit 310 supports the first operation unit 20 and the second operation unit 30 moveably in each of the x-direction, the y-direction, and the z-direction. The transport unit 310 can highly accurately control the position of the end 11 of the first tip 10 and the position of the end 16 of the second tip 15.

Figure 4:
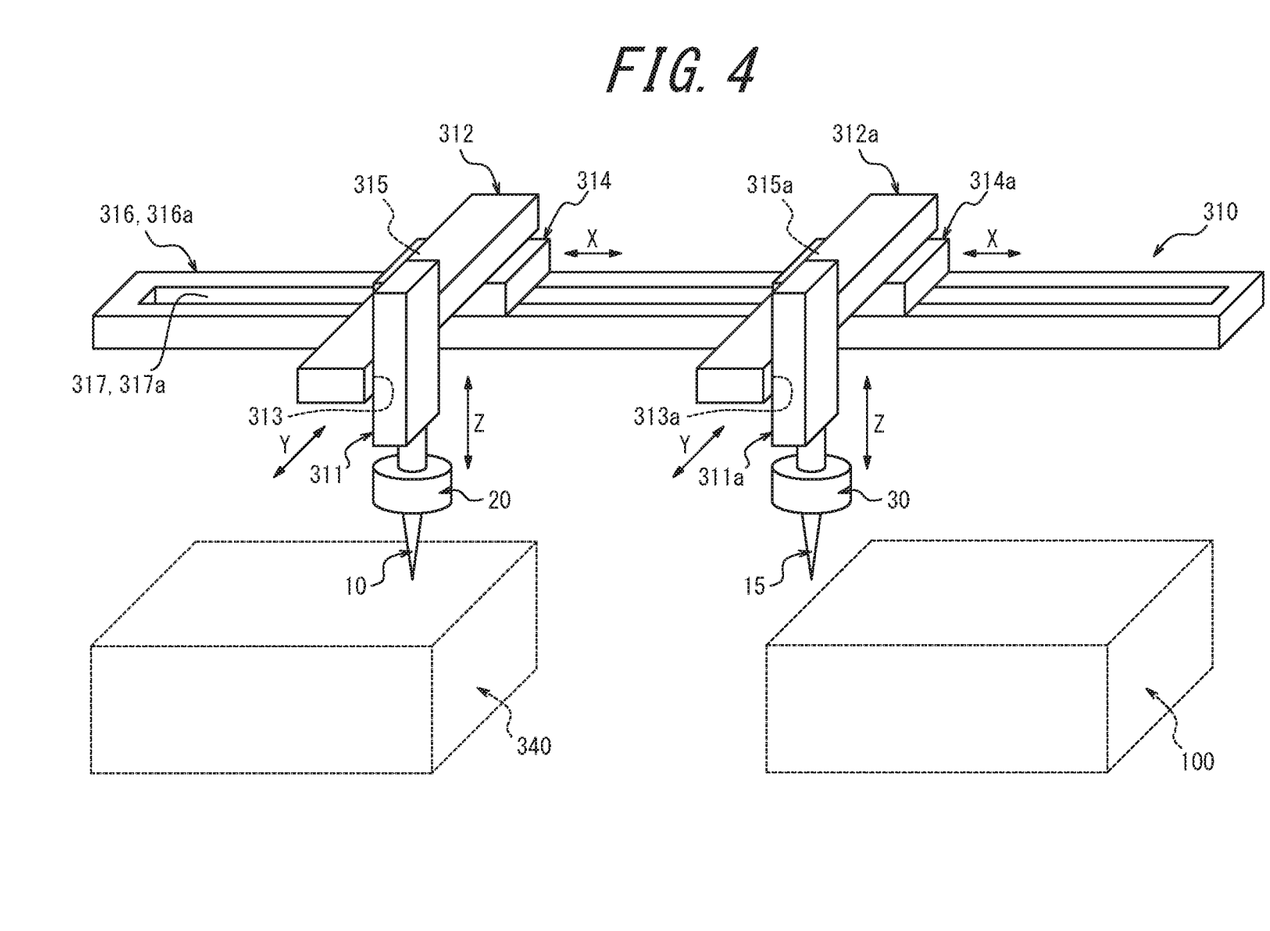
FIG. 4 schematically illustrates an example configuration of a transport unit of FIG. 1.

FIG. 4 schematically illustrates an example configuration of the transport unit 310. As illustrated in FIG. 4, the transport unit 310 includes a z-direction support 311, a z-direction guide 313, a y-direction support 312, a y-direction guide 315, an x-direction support 314, and an x-direction guide 317. The z-direction support 311 supports the first operation unit 20 movably in the z-direction. The z-direction guide 313 can guide the z-direction support 311 in the z-direction. The y-direction support 312 includes the z-direction guide 313 and supports the z-direction support 311 movably in the y-direction. The y-direction guide 315 can guide the y-direction support 312 in the y-direction. The x-direction support 314 includes the y-direction guide 315 and supports the y-direction support 312 movably in the x-direction. The x-direction guide 317 can guide the x-direction support 314 in the x-direction. Here, a fixed body 316 does not move in any of the x-direction, the y-direction, and the z-direction. One of the z-direction guide 313 provided in the y-direction support 312 and a non-guiding section guided into the z-direction guide 313 may have the shape of a rail. One of the y-direction guide 315 provided in the x-direction support 314 and a non-guiding section guided into the y-direction guide 315 may have the shape of a rail. One of the x-direction guide 317 provided in the fixed body 316 and a non-guiding section guided into the x-direction guide 317 may have the shape of a rail.

As illustrated in FIG. 4, the transport unit 310 may include a z-direction support 311a, a z-direction guide 313a, a y-direction support 312a, a y-direction guide 315a, an x-direction support 314a, and an x-direction guide 317a. The z-direction support 311a supports the second operation unit 30 movably in the z-direction. The z-direction guide 313a can guide the z-direction support 311a in the z-direction. The y-direction support 312a includes the z-direction guide 313a and supports the z-direction support 311a movably in the y-direction. The y-direction guide 315a can guide the y-direction support 312a in the y-direction. The x-direction support 314a includes the y-direction guide 315a and supports the y-direction support 312a movably in the x-direction. The x-direction guide 317a can guide the x-direction support 314a in the x-direction. Here, a fixed body 316a does not move in any of the x-direction, the y-direction, and the z-direction. One of the z-direction guide 313a provided in the y-direction support 312a and a non-guiding section guided into the z-direction guide 313a may have the shape of a rail. One of the y-direction guide 315a provided in the x-direction support 314a and a non-guiding section guided into the y-direction guide 315a may have the shape of a rail. One of the x-direction guide 317a provided in the fixed body 316a and a non-guiding section guided into the x-direction guide 317a may have the shape of a rail.

As illustrated in FIG. 4, the fixed body 316 and the x-direction guide 317 for the first operation unit 20 and the fixed body 316a and the x-direction guide 317a for the second operation unit 30 may have a shared configuration. In this case, the x-direction support 314 for the first operation unit 20 and the x-direction support 314a for the second operation unit 30 interfere with each other in the x-direction. The position of the first operation unit 20 is therefore restricted to be on one side in the x-direction (the left side in FIG. 4) relative to the position of the second operation unit 30. Accordingly, the first operation unit 20 is restricted to be positioned towards the tip holder 340 from the second operation unit 30, as illustrated in FIG. 1. In other words, the second operation unit 30 is restricted to be positioned towards the sample holder 100 from the first operation unit 20.

The x-direction guide 317 for the first operation unit 20 may also be used as the x-direction guide 317a for the second operation unit 30, and the y-direction guide 315 for the first operation unit 20 may also be used as the y-direction guide 315a for the second operation unit 30. The x-direction guide 317 for the first operation unit 20 may also be used as the x-direction guide 317a for the second operation unit 30, the y-direction guide 315 for the first operation unit 20 may also be used as the y-direction guide 315a for the second operation unit, and the z-direction guide 313 for the first operation unit 20 may also be used as the z-direction guide 313a for the second operation unit 30.

As illustrated in FIG. 1, the optical system 200 includes the XY-stage 201 that supports the sample container 110, a microscope 210 that includes an object lens 211, a bright-field illumination source 213, a dichroic mirror 220, a variable magnification lens 221, a bright-field observation camera 222, and a confocal scanner 230.

The XY-stage 201 supports the sample container 110 moveably in the x-direction and the y-direction. In other words, the XY-stage 201 supports the sample container 110 moveably in the horizontal plane.

In the present embodiment, the optical system 200 is described as being capable of confocal two-color fluorescence observation and bright-field observation. The optical system 200 is not limited to this configuration.

The confocal scanner 230 includes a dichroic mirror 231, a pinhole array disc (Nipkow disk) 232, a microlens array disc 233, a relay lens 234, a dichroic mirror 235, a first bandpass filter 236a, a first lens 237a, a first camera 238a for fluorescence observation, a second bandpass filter 236b, a second lens 237b, a second camera 238a for fluorescence observation, and an excitation light source 239.

During bright-field observation, the bright-field illumination source 213 irradiates bright-field signal light towards the sample container 110. The irradiated bright-field signal light passes through the microscope 210, is reflected by the dichroic mirror 220, and is formed as an image by the variable magnification lens 221 on the bright-field observation camera 222. The bright-field illumination source 213 is toric (doughnut-shaped), for example, and partitions a hole 214 passing through in the up-down direction. The bright-field illumination source 213 is not limited to being toric and simply needs to have a central portion that is open in top view.

During fluorescence observation, an excitation light beam having a particular wavelength is emitted from the excitation light source 239 towards the sample container 110. Subsequently, a fluorescent signal with a longer wavelength than the excitation light beam is emitted from the sample excited by the excitation light beam. The fluorescent signal passes through the pinhole array disc 232 to form a confocal image. Subsequently, the fluorescent signal is reflected by the dichroic mirror 231 and forms an image, through the relay lens 234, on the first camera 238a for fluorescence observation and the second camera 238b for fluorescence observation.

The dichroic mirror 235 has the property of dispersing a fluorescent signal and is used to support simultaneous use of excitation light sources of multiple wavelengths. The first bandpass filter 236a and the second bandpass filter 236b are installed to improve the S/N ratio of the images and to transmit only the required wavelength bands of the fluorescent signal. Since the sample emits various fluorescent wavelengths, the first bandpass filter 236a and the second bandpass filter 236b preferably each include a plurality of bandpass filters, for example, and are preferably capable of using a filter wheel or the like to switch to the bandpass filter corresponding to the required wavelength.

As illustrated in FIG. 1, the information processing apparatus 400 is configured by a personal computer (PC) or the like and includes an image acquisition interface 410, an image processor 420, a display 430, an operation reception interface 440, a movement controller 450, and a memory 460.

The image acquisition interface 410 acquires images from the bright-field observation camera 222, the first camera 238a for fluorescence observation, and the second camera 238b for fluorescence observation. The image acquisition interface 410 may control the bright-field observation camera 222, the first camera 238a for fluorescence observation, and the second camera 238b for fluorescence observation to be capable of controlling the timing at which images are acquired.

The image processor 420 is configured by a processor or the like and performs image processing and various analyses on the images acquired by the image acquisition interface 410. Specifically, the image processor 420 can perform template matching or the like on the images acquired from the bright-field observation camera 222, the first camera 238a for fluorescence observation, and the second camera 238b for fluorescence observation to identify the cells/organelles serving as the sample and to calculate features such as the size, luminance, protein amount, ion amount, and the like of the identified cells. The image processor 420 also uses the calculated feature amounts to perform processing such as listing and graphing information related to cells.

The display 430 is configured to include any suitable display device and performs processing to display the images acquired by the image acquisition interface 410 and the result of image processing and analysis by the image processor 420. The operation reception interface 440 is configured to include any appropriate input device, such as a keyboard and mouse, and receives various operations from an operator.

The movement controller 450 is configured to include a processor or the like and can control movement of the XY-stage 201 to move the sample container 110. The movement controller 450 can control movement of the transport unit 310 to move each of the first operation unit 20 and the second operation unit 30 between the tip holder 340 and the sample holder 100. The movement controller 450 can control movement of the first operation unit 20 to attach or remove the first tip 10 and to perform an operation on the sample with the attached first tip 10. The movement controller 450 can control movement of the second operation unit 30 to attach or remove the second tip 15 and perform an operation on the sample with the attached second tip 15.

For example, the movement controller 450 controls movement of the transport unit 310 to move the first operation unit 20 directly above the unused first tip container 341 in the tip holder 340 and attach any first tip 10 contained in the unused first tip container 341 to the first operation unit 20. Subsequently, the movement controller 450 controls movement of the transport unit 310 to move the first operation unit 20 directly above the sample container 110 in the sample holder 100 and perform an operation on the sample at a predetermined operation position using the first tip 10. The operation position can, for example, be along the optical axis of the microscope 210. At this time, the XY-stage 201 moves the sample container 110 so that the sample targeted for operation is at the operation position. In this way, the end 11 of the first tip 10 and the sample targeted for operation overlap in the z-direction. When the operation position is a position corresponding to the hole 214 of the bright-field illumination source 213, the first tip 10 and the first operation unit 20 can be prevented from interfering with the bright-field illumination source 213 at the time of operations on the sample. After the operation is performed on the sample using the first tip 10, the movement controller 450 controls movement of the transport unit 310 to move the first tip 10 directly above the used first tip container 342 in the tip holder 340 and to detach the first tip 10 from the first operation unit 20 so that the first tip 10 is contained in the used first tip container 342. These operations are similar for the second operation unit 30 and the second tip 15 as well. At the operation position, the operation on the sample by the first operation unit 20 and the operation on the sample by the second operation unit 30 are performed alternatively.

The memory 460 stores the images acquired by the image acquisition interface 410, the analysis results of the image processor 420, and the like. The memory 460 stores programs and data in advance for the components of the information processing apparatus 400 to execute various functions. The memory 460 may store information of a predetermined time, used in the operation example described below, in advance.

(Operations of Sample Analysis Support Apparatus 1)

Next, examples of operations of the sample analysis support apparatus 1 according to an embodiment of the present disclosure are described with reference to FIGS. 5 to 7. The operations of the sample analysis support apparatus 1 are not limited to the examples described below.

Figure 5:
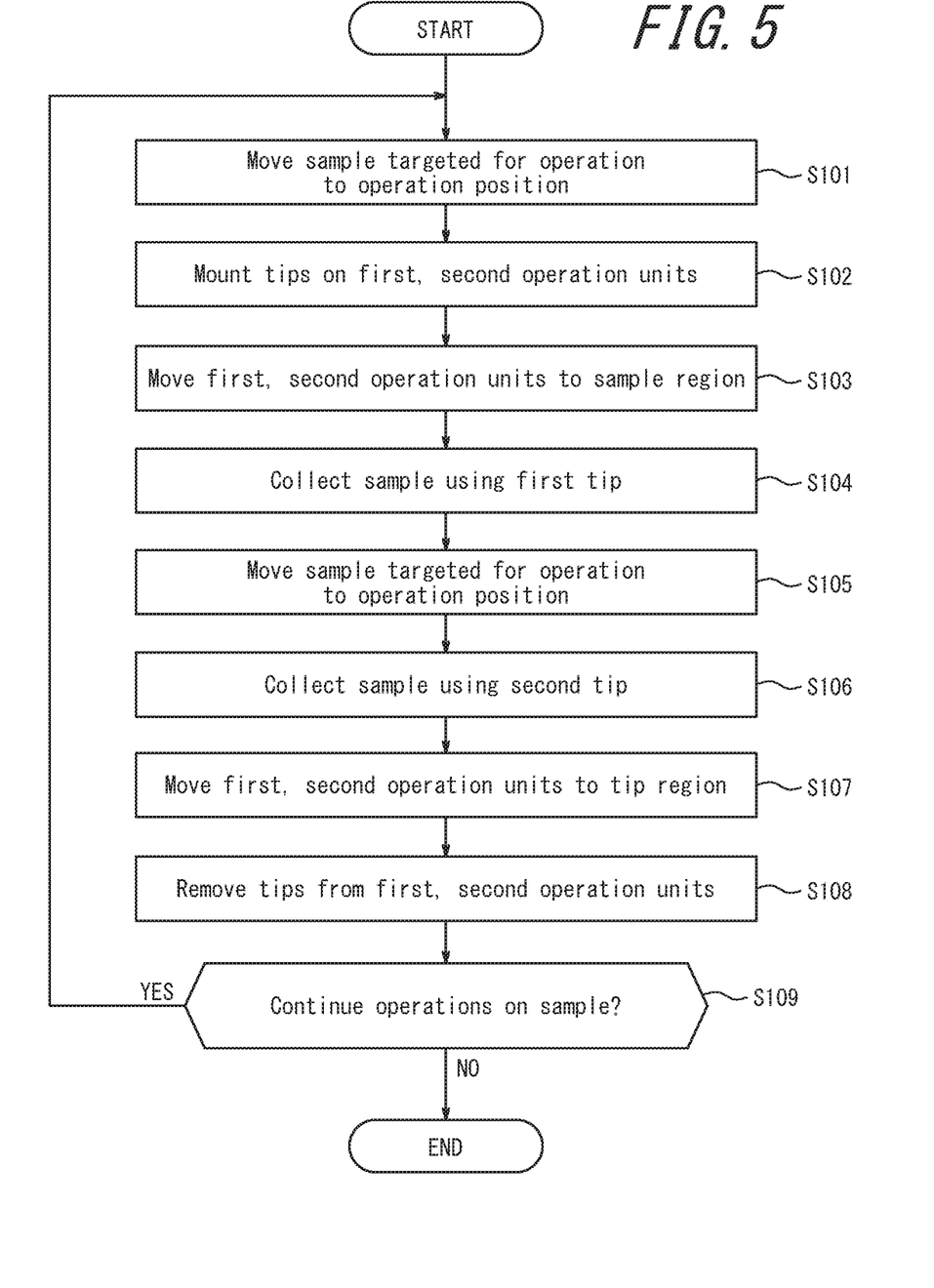
FIG. 5 is a flowchart illustrating a first example of operations of the sample analysis support apparatus of FIG. 1.

FIG. 5 is a flowchart illustrating a first example of operations of the sample analysis support apparatus 1. The first tip 10 and the second tip 15 used in the present example of operations are configured so that the end opening 12 of the first tip 10 and the end opening 17 of the second tip 15 have equivalent sizes. In other words, the inner diameter $\phi 1$ of the end opening 12 of the first tip 10 and the inner diameter $\phi 2$ of the end opening 17 of the second tip 15 are substantially equal. In the present example of operations, the operation on the sample by the first operation unit 20 includes collection of the sample, and the operation on the sample by the second operation unit 30 includes collection of the sample. The first operation unit 20 and the second operation unit 30 are described as being located in the tip holder 340 at the start of the present example of operations.

First, the movement controller 450 of the sample analysis support apparatus 1 controls movement of the XY-stage 201 to move the sample targeted for operation to the predetermined operation position (step S101). In greater detail, the sample analysis support apparatus 1 receives input of setting information, such as imaging conditions of the sample, an imaging range, and output conditions of the sample, by the operator operating the operation reception interface 440. In accordance with the inputted setting information, an image is captured by at least one of the bright-field observation camera 222, the first camera 238a for fluorescence observation, and the second camera 238b for fluorescence observation. After image capturing, the image acquisition interface 410 acquires the image, and the image processor 420 analyzes the image by image processing. The display 430 displays the analysis results and receives a designation by the operator, through the operation reception interface 440, of the sample targeted for operation. Alternatively, the sample analysis support apparatus 1 may automatically designate the sample targeted for operation based on the analysis results. The movement controller 450 then controls movement of the XY-stage 201 to move the sample targeted for operation to the predetermined operation position.

The movement controller 450 controls movement of the transport unit 310 and the first operation unit 20 to attach the first tip 10 to the first operation unit 20 and controls movement of the transport unit 310 and the second operation unit 30 to attach the second tip 15 to the second operation unit 30 (step S102). The processing of step S102 may be executed before the processing of step S101, executed simultaneously with the processing of step S101, or executed after the processing of step S101.

After the processing of step S102, the movement controller 450 controls movement of the transport unit 310 to move the first operation unit 20 and the second operation unit 30 to the sample holder 100 (step S103).

After the processing of step S103, the movement controller 450 controls movement of the transport unit 310 and the first operation unit 20 to move the first tip 10 to the operation position and collect the sample with the first tip 10 (step S104). The sample collected by the first tip 10 may, for example, be a specific cell or an intracellular substance.

After the processing of step S104, the movement controller 450 controls movement of the XY-stage 201 to move the next sample targeted for operation to the operation position (step S105). Details on the processing of step S105 are similar to the processing of the above-described step S101.

After the processing of step S105, the movement controller 450 controls movement of the transport unit 310 and the second operation unit 30 to move the second tip 15 to the operation position and collect the sample with the second tip 15 (step S106). The sample collected by the second tip 15 may, for example, be a specific cell or an intracellular substance. After the processing of step S105 and before the processing of step S106, the movement controller 450 controls movement of the transport unit 310 and the first operation unit 20 to remove the first tip 10 from the operation position.

After the processing of step S106, the movement controller 450 controls movement of the transport unit 310 to move the first operation unit 20 and the second operation unit 30 to the tip holder 340 (step S107).

After the processing of step S107, the movement controller 450 controls movement of the transport unit 310 and the first operation unit 20 to detach the first tip 10 from the first operation unit 20 and controls movement of the transport unit 310 and the second operation unit 30 to detach the second tip 15 from the second operation unit 30 (step S108).

The sample analysis support apparatus 1 judges whether operations on the sample are to be continued (step S109). When operations on the sample are to be continued (step S109: Yes), the sample analysis support apparatus 1 returns to the processing of step S101. When operations on the sample are not to be continued (step S109: No), the sample analysis support apparatus 1 ends the present example of operations. The judgment of whether to continue operations on the sample may be made based on whether an operation end instruction has been inputted by the operator via the operation reception interface 440, whether a sample targeted for operation can be designated based on the analysis result of the processing of step S101, or the like.

After the processing of step S104, the processing of steps S107 and S108 may be executed for the first operation unit 20 regardless of whether the processing of steps S105 and S106 has progressed. In other words, regardless of whether the processing of steps S105 and S106 has progressed after the sample is collected by the first tip 10, the movement controller 450 may move the first operation unit 20 to the tip holder 340 and detach the first tip 10 from the first operation unit 20. This enables the first tip 10 to be stored rapidly in the used first tip container 342 after the sample is collected by first tip 10, thereby suppressing degradation due to vaporization or the like of the sample inside the first tip 10.

The order in which the processing of step S104 and the processing of step S106 are executed may be reversed. However, when the position of the second operation unit 30 is restricted to be positioned towards the sample holder 100 from the first operation unit 20, as illustrated in FIGS. 1 and 4, then after the sample is collected by the second tip 15 (step S106), it is necessary to wait until the sample is collected by the first tip 10 (step S104) before proceeding to step S107. Therefore, to suppress degradation due to vaporization or the like of the sample inside the first tip 10, the processing of step S104 is preferably executed before the processing of step S106.

In this way, the present example of operations enables the first tip 10 and the second tip, whose end openings are equivalent in size, to collect samples using the corresponding first operation unit 20 and second operation unit 30. The transportation time of the collected sample can therefore be shortened and throughput improved as compared to when only one operation unit is included.

Figure 6:
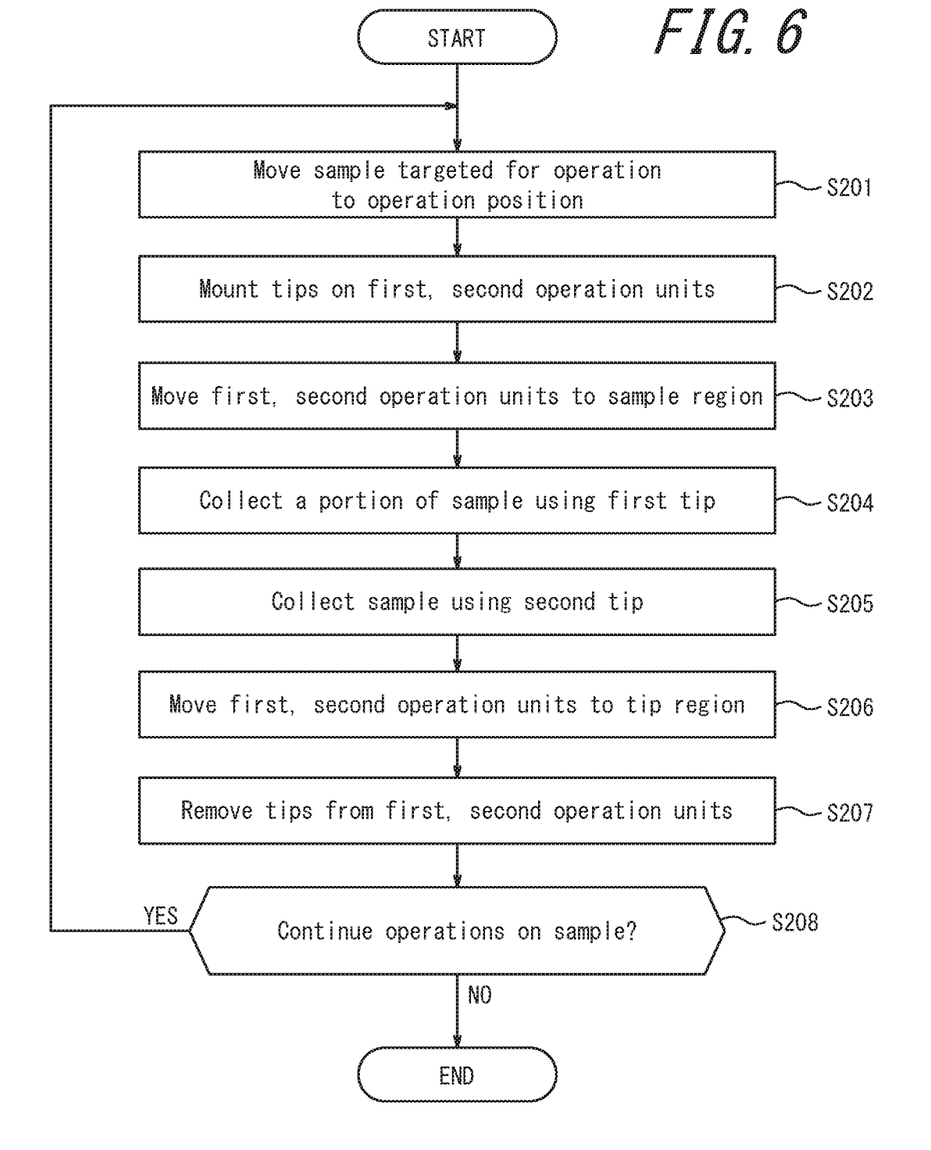
FIG. 6 is a flowchart illustrating a second example of operations of the sample analysis support apparatus of FIG. 1.

FIG. 6 is a flowchart illustrating a second example of operations of the sample analysis support apparatus 1. The first tip 10 and the second tip 15 used in the present example of operations are configured so that the end opening 12 of the first tip 10 is smaller than the end opening 17 of the second tip 15. In other words, the inner diameter φ1 of the end opening 12 of the first tip 10 is smaller than the inner diameter φ2 of the end opening 17 of the second tip 15. In the present example of operations, the operation on the sample by the first operation unit 20 includes collection of the sample, and the operation on the sample by the second operation unit 30 includes collection of the sample. The first operation unit 20 and the second operation unit 30 are described as being located in the tip holder 340 at the start of the present example of operations.

First, the movement controller 450 of the sample analysis support apparatus 1 controls movement of the XY-stage 201 to move the sample targeted for operation to the operation position (step S201). Details on the processing of step S201 are similar to the processing of step S101 of the first example of operations.

The movement controller 450 controls movement of the transport unit 310 and the first operation unit 20 to attach the first tip 10 to the first operation unit 20 and controls movement of the transport unit 310 and the second operation unit 30 to attach the second tip 15 to the second operation unit 30 (step S202). The processing of step S202 may be executed before the processing of step S201, executed simultaneously with the processing of step S201, or executed after the processing of step S201.

After the processing of step S202, the movement controller 450 controls movement of the transport unit 310 to move the first operation unit 20 and the second operation unit 30 to the sample holder 100 (step S203).

After the processing of step S203, the movement controller 450 controls movement of the transport unit 310 and the first operation unit 20 to move the first tip 10 to the operation position and collect a portion of the sample with the first tip 10 (step S204). The portion of the sample collected by the first tip 10 may, for example, be a specific cell or an intracellular substance.

After the processing of step S204, the movement controller 450 controls movement of the transport unit 310 and the second operation unit 30 to move the second tip 15 to the operation position and collect the sample with the second tip 15 (step S205). The sample collected by the second tip 15 may, for example, be a specific cell that includes an intracellular substance collected by the first tip 10. After the processing of step S204 and before the processing of step S205, the movement controller 450 controls movement of the transport unit 310 and the first operation unit 20 to remove the first tip 10 from the operation position.

After the processing of step S205, the movement controller 450 controls movement of the transport unit 310 to move the first operation unit 20 and the second operation unit 30 to the tip holder 340 (step S206).

After the processing of step S206, the movement controller 450 controls movement of the transport unit 310 and the first operation unit 20 to detach the first tip 10 from the first operation unit 20 and controls movement of the transport unit 310 and the second operation unit 30 to detach the second tip 15 from the second operation unit 30 (step S207).

The sample analysis support apparatus 1 judges whether operations on the sample are to be continued (step S208). When operations on the sample are to be continued (step S208: Yes), the sample analysis support apparatus 1 returns to the processing of step S201. When operations on the sample are not to be continued (step S208: No), the sample analysis support apparatus 1 ends the present example of operations. The judgment of whether to continue operations on the sample may be made based on whether an operation end instruction has been inputted by the operator via the operation reception interface 440, whether a sample targeted for operation can be designated based on the analysis result of the processing of step S201, or the like.

After the processing of step S204, the processing of steps S206 and S207 may be executed for the first operation unit 20 regardless of whether the processing of step S205 has progressed. In other words, regardless of whether the processing of step S205 has progressed after the sample is collected by the first tip 10, the movement controller 450 may move the first operation unit 20 to the tip holder 340 and detach the first tip 10 from the first operation unit 20. This enables the first tip 10 to be stored rapidly in the used first tip container 342 after the sample is collected by first tip 10, thereby suppressing degradation due to vaporization or the like of the sample inside the first tip 10.

In this way, the present example of operations enables an intracellular substance of a specific cell to be collected using the first tip 10 with the small end opening 12, and the specific cell to be collected using the second tip 15 with the large end opening 17. Mass spectrometry using the intracellular substance from the first tip 10 and RNA analysis using the cell from the second tip 15, for example, can therefore be performed simultaneously on the same cell. Accordingly, the range of analysis applications can be broadened.

Figure 7:
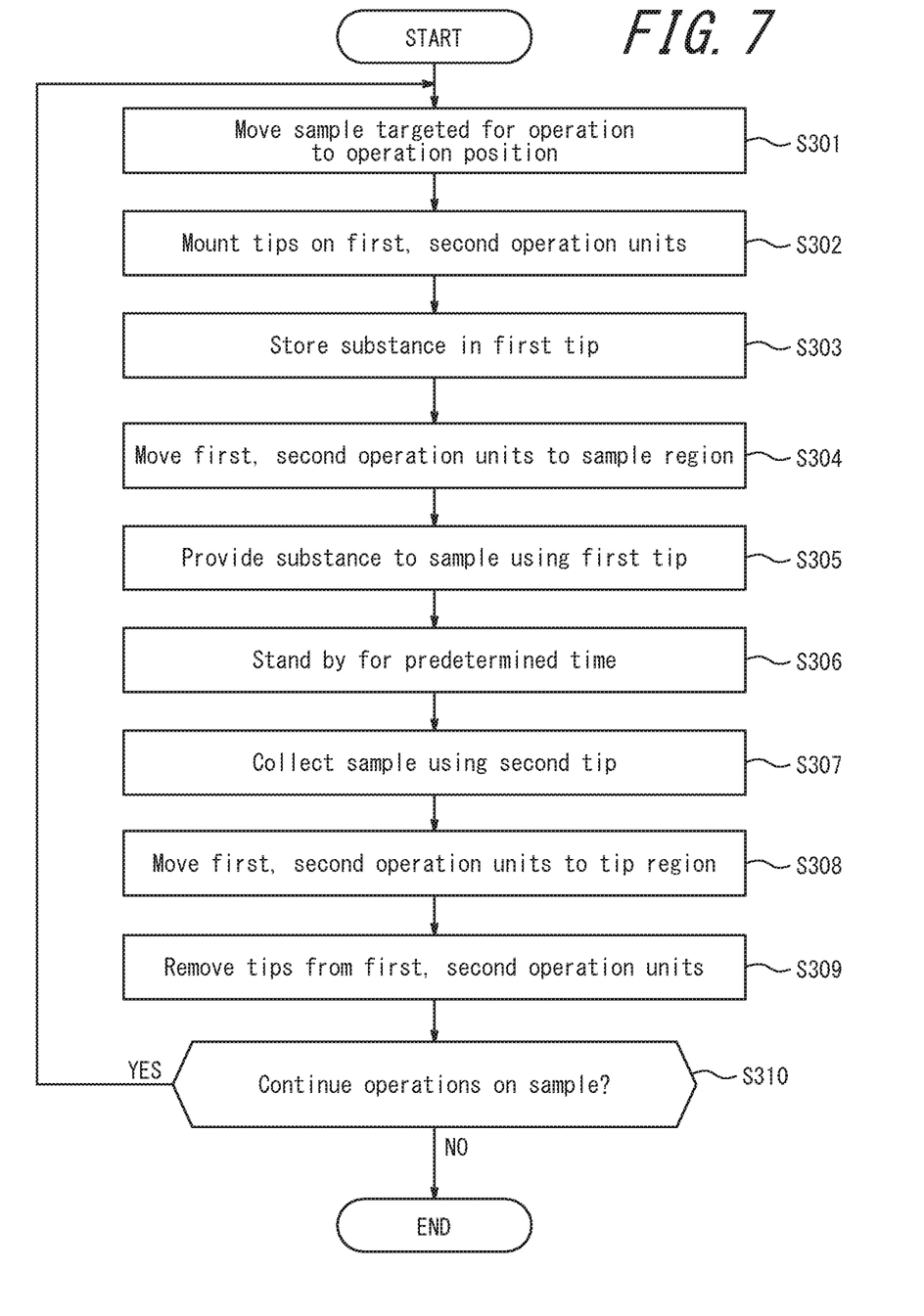
FIG. 7 is a flowchart illustrating a third example of operations of the sample analysis support apparatus of FIG. 1.

FIG. 7 is a flowchart illustrating a third example of operations of the sample analysis support apparatus 1. In the present example of operations, the operation on the sample by the first operation unit 20 includes provision of a substance to the sample, and the operation on the sample by the second operation unit 30 includes collection of the sample. The first operation unit 20 and the second operation unit 30 are described as being located in the tip holder 340 at the start of the present example of operations.

First, the movement controller 450 of the sample analysis support apparatus 1 controls movement of the XY-stage 201 to move the sample targeted for operation to the operation position (step S301). Details on the processing of step S301 are similar to the processing of step S101 of the first example of operations.

The movement controller 450 controls movement of the transport unit 310 and the first operation unit 20 to attach the first tip 10 to the first operation unit 20 and controls movement of the transport unit 310 and the second operation unit 30 to attach the second tip 15 to the second operation unit 30 (step S302). The processing of step S302 may be executed before the processing of step S301, executed simultaneously with the processing of step S301, or executed after the processing of step S301.

After the processing of step S303, the movement controller 450 controls movement of the transport unit 310 and the first operation unit 20 to collect the substance contained in the substance container 343 and store the substance inside the first tip 10 (step S303). When the first tip 10 holds the substance in advance, the processing of step S303 may be omitted.

After the processing of step S303, the movement controller 450 controls movement of the transport unit 310 to move the first operation unit 20 and the second operation unit 30 to the sample holder 100 (step S304).

After the processing of step S304, the movement controller 450 controls movement of the transport unit 310 and the first operation unit 20 to move the first tip 10 to the operation position and provide the substance inside the first tip 10 to the sample (step S305). The sample to which the first tip 10 provides the substance is, for example, a specific cell.

After the processing of step S305, the movement controller 450 stands by for a predetermined time based on information, stored in the memory 460, indicating the predetermined time (step S306). This predetermined time is, for example, the time required until it is possible to observe changes that occur due to the substance, such as a compound, reacting or the like with the sample, such as a cell.

After the processing of step S306, the movement controller 450 controls movement of the transport unit 310 and the second operation unit 30 to move the second tip 15 to the operation position and collect the sample with the second tip 15 (step S307). The sample collected by the second tip 15 is, for example, the specific cell to which the first tip 10 provided the substance, an intracellular substance of the specific cell, or a cell close to the specific cell. After the processing of step S305 and before the processing of step S307, the movement controller 450 controls movement of the transport unit 310 and the first operation unit 20 to remove the first tip 10 from the operation position.

After the processing of step S307, the movement controller 450 controls movement of the transport unit 310 to move the first operation unit 20 and the second operation unit 30 to the tip holder 340 (step S308).

After the processing of step S308, the movement controller 450 controls movement of the transport unit 310 and the first operation unit 20 to detach the first tip 10 from the first operation unit 20 and controls movement of the transport unit 310 and the second operation unit 30 to detach the second tip 15 from the second operation unit 30 (step S309).

The sample analysis support apparatus 1 judges whether operations on the sample are to be continued (step S310). When operations on the sample are to be continued (step S310: Yes), the sample analysis support apparatus 1 returns to the processing of step S301. When operations on the sample are not to be continued (step S310: No), the sample analysis support apparatus 1 ends the present example of operations. The judgment of whether to continue operations on the sample may be made based on whether an operation end instruction has been inputted by the operator via the operation reception interface 440, whether a sample targeted for operation can be designated based on the analysis result of the processing of step S301, or the like.

In this way, the present example of operations enables a substance such as a compound to be provided to a specific cell using the first tip 10 and enables the specific cell, an intracellular substance of the specific cell, or a cell close to the specific cell to be collected using the second tip 15. The effect of providing the substance to the specific cell can therefore be observed. Specifically, the first tip 10 may be used to inject an anticancer agent into a cancer cell, and cells near the cancer cell may be collected using the second tip 15 to observe the effects or the like of the anticancer agent on the nearby, cells.

The present disclosure is not limited to the configurations specified in the above embodiment, and a variety of modifications may be made without departing from the scope of the claims. For example, the sample analysis support apparatus 1 is not limited to including the first operation unit 20 and the second operation unit 30 and may include three or more operation units. In this case, a plurality of types of substances may be provided to the sample using a plurality of operation units, for example, and the sample may be collected with another operation unit.

INDUSTRIAL APPLICABILITY

The present disclosure relates to a sample analysis support apparatus.

REFERENCE SIGNS LIST

1 Sample analysis support apparatus
10 First tip
11 End of first tip
12 End opening of first tip
13 Hollow section of first tip
15 Second tip
16 End of second tip
17 End opening of second tip
18 Hollow section of second tip
20 First operation unit
30 Second operation unit
100 Sample holder
110 Sample container
200 Optical system
201 XY-stage
210 Microscope
211 Object lens
213 Bright-field illumination source
214 Hole
220 Dichroic mirror
221 Variable magnification lens
222 Bright-field observation camera
230 Confocal scanner
231 Dichroic mirror
232 Pinhole array disc
233 Microlens array disc
234 Relay lens
235 Dichroic mirror
236a First bandpass filter
236b Second bandpass filter
237a First lens
237b Second lens
238a First camera for fluorescence observation
238b Second camera for fluorescence observation
239 Excitation light source
300 Operation unit
310 Transport unit
311, 311a Z-direction support
312, 312a Y-direction support
313, 313a Z-direction guide
314, 314a X-direction support
315, 315a Y-direction guide
316, 316a Fixed body
317, 317a X-direction guide
340 Tip holder
341 Unused first tip container
341a Unused second tip container
342 Used first tip container
342a Used second tip container
343 Substance container
400 Information processing apparatus
410 Image acquisition interface
420 Image processor
430 Display
440 Operation reception interface
450 Movement controller
460 Memory
ϕ1 Inner diameter of end opening of first tip
ϕ2 Inner diameter of end opening of second tip

The invention claimed is:

1. A sample analysis support apparatus comprising:
a sample holder in which a sample is to be disposed;
a tip holder in which a tip is to be disposed;
a first operation unit, as a suction unit and/or an injection unit, capable of an operation on the sample using the tip, the tip being attachable to and detachable from the first operation unit;
a second operation unit, as a suction unit and/or an injection unit, capable of an operation on the sample using the tip, the tip being attachable to and detachable from the second operation unit;
a transport stage configured to support each of the first operation unit and the second operation unit moveably between the tip holder and the sample holder;
a microscope;
an annular bright-field illumination source with a center hole, the annular bright-field illumination source being disposed above the sample holder, wherein the predetermined position is corresponding to the center hole of the bright-field annular illumination source;
a bright-field observation camera configured to receive light from the annular bright-field illumination source through the sample holder and the microscope; and
a movement controller programmed to control the transport stage to move each of the first operation unit and the second operation unit between the tip holder and the sample holder such that the operation on the sample by the first operation unit and the operation on the sample by the second operation unit are performed alternatively at a predetermined operation position of the sample holder, the predetermined operation position being along an optical axis of the microscope;
wherein the transport stage includes, for the first operation unit, a z-direction support configured to support the first operation unit movably in a z-direction, which is the vertical direction, a z-direction guide capable of guiding the z-direction support in the z-direction, a y-direction support including the z-direction guide and configured to support the z-direction support movably in a y-direction, which is a predetermined direction in the horizontal plane, a y-direction guide capable of guiding the y-direction support in the y-direction, an x-direction support including the y-direction guide and configured to support the y-direction support movably in an x-direction, which is a direction orthogonal to the y-direction in the horizontal plane, and an x-direction guide capable of guiding the x-direction support in the x-direction;
the transport stage includes, for the second operation unit, a z-direction support configured to support the second operation unit movably in a z-direction, which is the vertical direction, a z-direction guide capable of guiding the z-direction support in the z-direction, a y-direction support including the z-direction guide and configured to support the z-direction support movably in a y-direction, which is a predetermined direction in the horizontal plane, a y-direction guide capable of guiding the y-direction support in the y-direction, an x-direction support including the y-direction guide and configured to support the y-direction support movably in an x-direction, which is a direction orthogonal to the y-direction in the horizontal plane, and an x-direction guide capable of guiding the x-direction support in the x-direction; and
the x-direction guide for the first operation unit is used as the x-direction guide for the second operation unit.

2. The sample analysis support apparatus of claim 1,
wherein the operation on the sample by the first operation unit comprises collection of the sample and/or provision of a substance to the sample; and
wherein the operation on the sample by the second operation unit comprises collection of the sample and/or provision of a substance to the sample.

3. The sample analysis support apparatus of claim 2, wherein the tip comprises an end opening, located at an end of the tip, to enable collection of the sample and/or provision of a substance to the sample.

4. The sample analysis support apparatus of claim 3,
wherein the operation on the sample by the first operation unit comprises collection of the sample; and
wherein the operation on the sample by the second operation unit comprises collection of the sample.

5. The sample analysis support apparatus of claim 4,
wherein the tip comprises a first tip attachable to and detachable from the first operation unit and a second tip attachable to and detachable from the second operation unit; and
wherein the end opening of the first tip and the end opening of the second tip are equivalent in size.

6. The sample analysis support apparatus of claim 4,
wherein the tip comprises a first tip attachable to and detachable from the first operation unit and a second tip attachable to and detachable from the second operation unit; and
wherein the end opening of the first tip is smaller than the end opening of the second tip.

7. The sample analysis support apparatus of claim 6,
wherein the operation on the sample by the first operation unit comprises collection of an intracellular substance of a specific cell; and
wherein the operation on the sample by the second operation unit comprises collection of the specific cell.

8. The sample analysis support apparatus of claim 3,
wherein the operation on the sample by the first operation unit comprises provision of a substance to the sample; and
wherein the operation on the sample by the second operation unit comprises collection of the sample.

9. The sample analysis support apparatus of claim 8,
wherein the operation on the sample by the first operation unit comprises provision of a substance to a specific cell; and
wherein the operation on the sample by the second operation unit comprises collection of the specific cell, an intracellular substance of the specific cell, or a cell close to the specific cell.

10. The sample analysis support apparatus of claim 1, wherein the y-direction guide for the first operation unit is used as the y-direction guide for the second operation unit.

11. The sample analysis support apparatus of claim 1, wherein the z-direction guide for the first operation unit is used as the z-direction guide for the second operation unit.

* * * * *